Aug. 25, 1931.  N. K. SMITH  1,820,545
CASING TONG
Filed Sept. 27, 1927
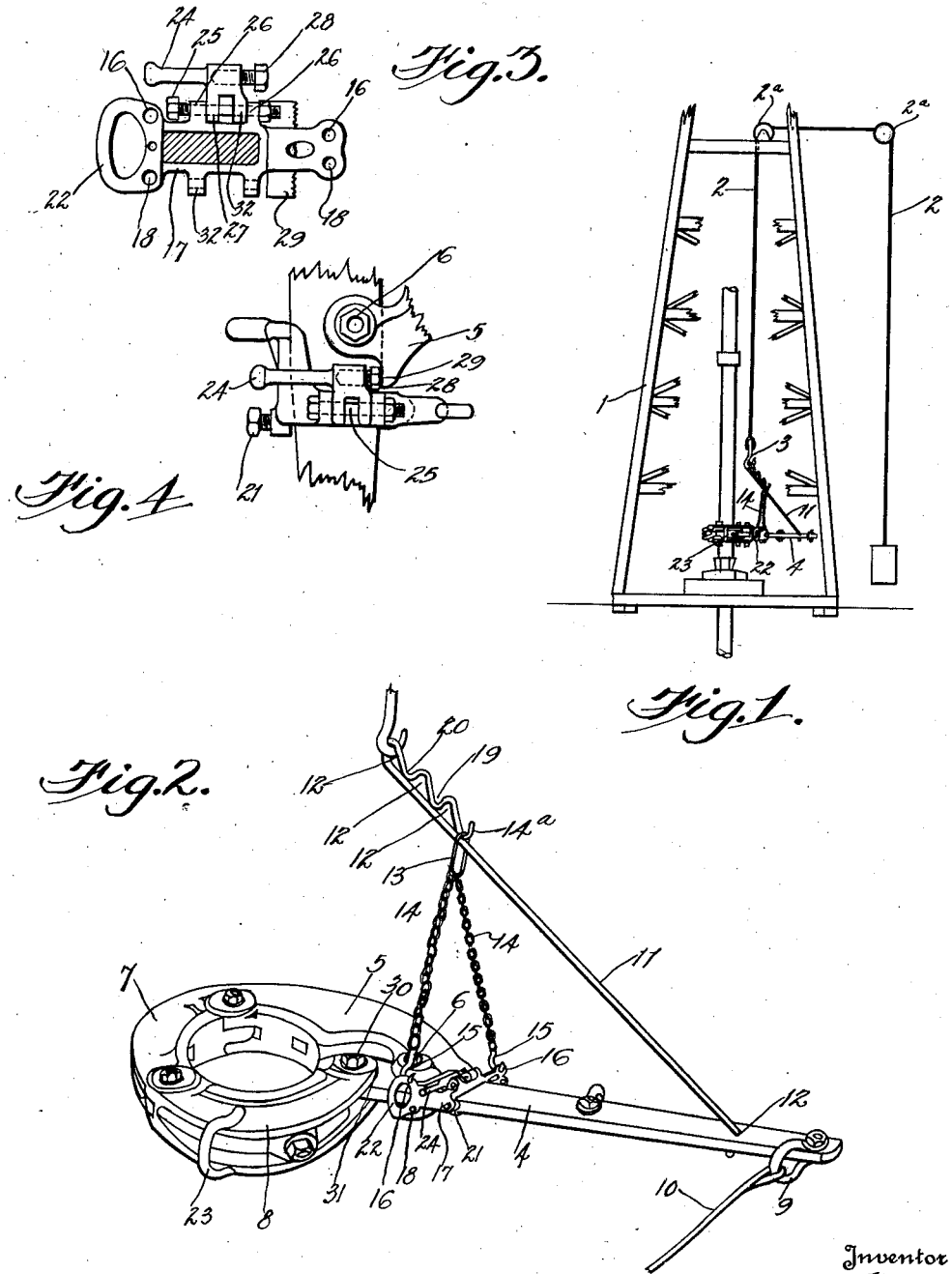
Inventor
Nelson K. Smith
By Lyon & Lyon
Attorneys Patented Aug. 25, 1931

1,820,545

UNITED STATES PATENT OFFICE

NELSON K. SMITH, OF LOS ANGELES, CALIFORNIA, ASSIGNOR TO BYRON JACKSON CO., OF WEST BERKELEY, CALIFORNIA, A CORPORATION OF DELAWARE

CASING TONG

Application filed September 27, 1927. Serial No. 222,237.

This invention relates to casing tongs and is more particularly related to casing tongs, such for example as are employed for the purpose of making up and breaking drill stems, casings and the like, in the drilling of oil or like wells.

Casing tongs are suspended in a derrick over a pulley by means of a cable. The casing tongs should be suspended on this line in a manner to permit the same to occupy a horizontal position relative to the casing or drill pipe upon which the same are to be employed so that the gripping members of said tongs will accurately grip and hold the pipe. The center of gravity of the tongs should be on substantially the center of the derrick when the same have been suspended in the gripping position. The line from which the casing tongs is suspended is in different derricks trained over differently positioned pulleys making it necessary in order to properly suspend the tongs to provide adjustment means in the suspension means from the line to the tongs for adjusting the suspension means to properly locate the center of gravity. When no such adjustment means are provided and the casing tongs are not properly suspended within the well, speed of operation of the casing tongs is sacrificed, making it necessary for the operators thereof to partially balance the tongs themselves when applying the same to the drill pipe or casing. The tongs being properly suspended over the well, it is possible to merely swing the tongs toward the casing or pipe and give the same a slight twist and the tongs will automatically lock themselves on the casing or drill pipe, enabling the greatest possible speed of operation which is essential to the successful and economical drilling of an oil well.

An object of this invention is, therefore, to provide means for adjustably suspending tongs from a cable of an oil well derrick to permit the suspension means to be adjusted to accurately locate the center of gravity of the tongs relative to the pipe to be gripped thereby.

Another object of this invention is to provide a casing tong including a handle having gripping means secured to one end thereof, a suspension truss bar secured to said handle at the other end thereof, a cable hook, means for adjustably securing said cable hook to the free end of the truss bar, and means secured to the truss bar between its ends and secured to the tong handle between its ends.

Another object of this invention is to provide a casing tong including a three-point suspension means for suspending the tong from a hook secured to the suspension line which is trained over a sheave of the crown block of a well derrick, the suspension means including a truss bar secured to the end of the handle of the casing tongs and provided with means for adjustably securing the same to the cable hook and means secured to the truss bar and adapted to be secured to two laterally spaced connecting means on said handle.

Another object of this invention is to provide a locking means adapted to be quickly and efficiently operated for locking the casing tongs in the gripping position upon the pipe or drill stem and which locking means include a slide member slidably mounted upon the handle and providing laterally spaced suspension means to which the suspension members of the tong suspending means are adapted to be secured.

Other objects and advantages of this invention, it is believed, will be apparent from the following detailed description of a preferred embodiment thereof, as illustrated in the accompanying drawings.

In the drawings:

Figure 1 is an elevation of a well derrick illustrating the manner of suspending the casing tong therein in position to grip the casing or drill pipe.

Figure 2 is a perspective view of a casing tong illustrating the adjustable suspension means embodying this invention.

Figure 3 is an enlarged fragmental view illustrating the lock means for locking the gripping means of the casing tong in the gripping position, embodying this invention.

Figure 4 is a fragmental plan view particularly illustrating the locking means.

In the preferred embodiment of this invention illustrated in the accompanying drawings, 1 indicates a well derrick having a line 2 trained over a pulley 2a mounted therein. The line 2 is provided at its end with a cable hook 3. Suspended from the hook 3 is the casing tong which includes a handle 4 and a gripping segment or bowl 5 which is pivotally mounted on the handle 4 at a pin 6. Pivotally secured to the bowl 5 are gripping segments 7 and 8. The gripping means provided in the casing tong may be in accordance with this invention of any suitable or desirable construction or form such as is employed for the gripping of well casings, the collars thereof, or tool joints, as desired.

The handle 4 is provided with any suitable or desirable form of securing means as illustrated at 9 for securing the handle to the cat line 10 which is operated from the rotary drawworks cathead or for securing the handle 4 to the dead line.

Means are provided for suspending the casing tongs from the cable hook 3 so that the center of gravity of the casing hook lies in a position to maintain the casing tong horizontal in the well derrick to cause the gripping means provided by the bowl 5 and gripping links 7 and 8 to accurately grip the pipe or well casing, which means preferably include a truss bar 11 which is secured to the end of the handle 4 by any suitable or desirable means such, for example, as having the end of the truss bar extend through a bore 12 formed in the handle 4 and being secured in position by means of a nut screw-threaded thereto. The opposite end of the truss bar 11 is provided with means for adjustably securing the cable hook 3 to said truss bar 11 to vary the position of the center of gravity of the casing tongs in relation to the cable secured to the cable hook 3, and which means may be of any suitable or desirable form and are herein illustrated as comprising a plurality of eyes 12 formed by bending the end of the truss bar 11 upon itself.

Means are provided for securing the truss bar 11 to the handle 4 of the casing tongs at a point spaced from the bore 12 and which means are preferably constructed so as to permit the casing tongs to be inverted relative to the suspension means and are preferably formed of a link 13 which is adapted to be secured to the hook 14a formed at the end of the bent portion of the truss rod 11 and is provided with a pair of chains 14 having hooks 15 at their ends which are adapted to fit within eyes 16 formed on the slide 17 which is mounted on the handle 4. The eyes 16 are formed at transversely spaced points across the handle 4 to provide a three-point suspension means for suspending the casing tongs. When it is desired to invert the casing tongs, it is only necessary to remove the hooks 15 and the end of the truss rod 11 and then turn the casing tongs over and secure the truss rod 11 through the bore 12 in the reverse direction and secure the hooks 15 in the second pair of eyes 18 formed in the slide 17.

An accurate adjustment of the center of gravity of the tongs relative to the hook 3 is provided by the link 13 being adjustable in the series of hooks formed, as indicated at 19 and 20 by the bent portion of the truss rod 11 varying the position on the truss rod 11 to which the chains 14 are secured. A further adjustment of the center of gravity of the tongs is provided by the position of the slide 17 on the handle 4. The slide 17 is formed of a casting adapted to slide over the handle 4 and is secured in position by means of a set screw 21. The casting of which the slide 17 is formed is also formed to provide a handle 22 which is gripped by the operator along with the handle 23 formed on the link 8 of the gripping means in order to close the tongs on the pipe.

Means are provided for locking the gripping means in the closed position in order to insure absolute safety to the operators of the tongs and the maximum efficiency in operation, which means preferably comprise a lock bolt 24 which is pivotally mounted on a bolt 25, passed through the ears 26 formed on the slide 17. The lock bolt 24 is pivotally mounted on the bolt 25 by the bolt 25 passing through ears 27 formed integral with the bolt 24 so that the bolt 24 may be rotated to and from the locking position to cause the cap screw 28, screw-threaded in the end thereof, to engage the shoulder 29 formed on the bowl 5 in order to hold the bowl 5 in the closed or gripping position. The holding of the bowl 5 in the closed or gripping position also holds the links 7 and 8 in the gripping position as the pin 30 carried by the link 8 is gripped by the lock jaw 31. The cap screw 28 is screw-threaded in the end of the bolt 24 in order to permit adjustment of the position in which the same will engage the shoulder 29 formed on the bowl 5 and consequently permit adjustment of the locking position in which the gripping means are locked.

Formed on the other side of the slide 17 is a second pair of eyes 32 similar to the eyes 26 between which the eyes 27 formed on the lock bolt 24 may be inserted and secured by means of the bolt 25 when the tongs are inverted.

Having fully described my invention, it is to be understood that I do not wish to be limited to the details herein set forth but my invention is of the full scope of the appended claims.

I claim:

1. In combination with a device of the class described, including a handle and a weighted head, a suspension device including a truss bar adapted to be secured to the handle at a point near the outer end thereof, the truss bar being formed at its upper end with a multiplicity of spaced hooks, and means adapted to be secured to any one of said hooks at the upper end of said means and adapted to be secured at its opposite end to the opposed sides of said handle.

2. In combination with a device of the class described, including a handle and a weighted head, a suspension device including a truss bar adapted to be secured to said handle at a point near the outer end thereof, the truss bar having formed at its opposite end a pair of series of longitudinally spaced hooks, suspension means adapted to be secured to said truss bar in any one of said hooks of one of said series, and means adapted to be secured in any one of said hooks of the other of said series, and adapted to be secured to opposed sides of said handle.

3. In a device of the class described, including a handle and a weighted head, of a suspension device including a truss bar adapted to be secured to said handle at a point near the outer end thereof, the truss bar extending diagonally upward from said handle and being bent upon itself at its upper end to form two independent series of longitudinally spaced hooks, and means adapted to be secured in any one of said hooks of one series for suspending the device, and means adapted to be secured in any one of said hooks of the other of said series at one end and adapted to be secured to said handle at the opposite end.

4. In a device of the class described, the combination of a truss bar having a pair of series of longitudinally spaced hooks at one end, suspension means adapted to be secured in any one of said hooks of one of said series, and means adapted to be secured in any one of said hooks of the other of said series.

5. In combination with a device of the class described, including a handle and a weighted head, a suspension device including a truss bar adapted for connection at one end of said bar with said handle at a point near the outer end of said handle, said truss bar being provided adjacent to its opposite end with a multiplicity of spaced eyes, and means adapted for selectively engaging said eyes at one end of said means and adapted to be secured at its opposite end to the opposed sides of the handle.

6. In combination with a device of the class described, including a handle and a weighted head, a suspension device including a truss bar adapted for connection at one end of said bar with said handle at a point near the outer end of said handle, members adapted for connection with the opposed sides of the handle, and means for selectively connecting said members to the truss bar at a multiplicity of points therealong.

7. A casing tong comprising gripping means including pivotally connected gripping segments, a handle pivoted at different points thereof to said segments, and releasable cooperating means on one of said segments and the handle to prevent relative pivotal movement between said last mentioned segment and handle in a direction to expand the gripping means, said cooperating means including a means for fastening to a suspension device.

8. A casing tong comprising gripping means including pivotally connected gripping segments, a handle pivoted at different points thereof to said segments, a shoulder on one of said segments, a member mounted on the handle for connecting the handle to a suspension device, and a retractable latch bolt mounted on said member and adapted to engage the shoulder.

9. A casing tong comprising gripping means including pivotally connected segments, a handle pivoted at different points thereof to said segments, a slide, a means to adjustably secure the slide to the handle, and means on the slide for connecting said slide to a suspension device.

Signed at Los Angeles, California, this 17 day of September, 1927.

NELSON K. SMITH.